INVENTOR
JOHN G. LORD
BY Louis Necho
ATTORNEY

INVENTOR.
JOHN G. LORD
BY Louis Nechs
ATTORNEY.

INVENTOR.
JOHN G. LORD
BY Louis Necho
ATTORNEY.

INVENTOR.
JOHN G. LORD
BY Louis Necho
ATTORNEY

INVENTOR
JOHN G. LORD
BY Louis Nealon
ATTORNEY

INFORMATION COMPARING AND SUMMARIZING MACHINE

Filed July 21, 1966 7 Sheets-Sheet 6

INVENTOR.
JOHN G. LORD

BY Louis Neeko
ATTORNEY.

INVENTOR.
JOHN G. LORD
BY Louis Neoks
ATTORNEY.

3,401,472
Patented Sept. 17, 1968

3,401,472
INFORMATION COMPARING AND SUMMARIZING MACHINE

John G. Lord, Swarthmore, Pa.
(14 W. Winona Ave., Norwood, Pa. 19074)

Filed July 21, 1966, Ser. No. 566,787
11 Claims. (Cl. 35—48)

This invention relates to a portable, mechanical, manually-operable apparatus which scans data punched in cards, and which also summarizes the results obtained.

More specifically, the invention relates to an apparatus which checks the correctness of answers to single, or to multiple choice questions and which summarizes the results, for easy coordination and interpretation. Such an apparatus has application in the teaching field; in the aptitude-test field; in the field of sampling "public opinion;" and so on.

The full nature of the invention will be understood from the following specification and the accompanying drawings in which.

Since cams, bell cranks, linkages, ratchets, pawls, springs, etc., are old and can be made and assembled by any skilled mechanic, they are shown either diagrammatically and described briefly, or they are omitted entirely.

Figures 1, 2, 13:
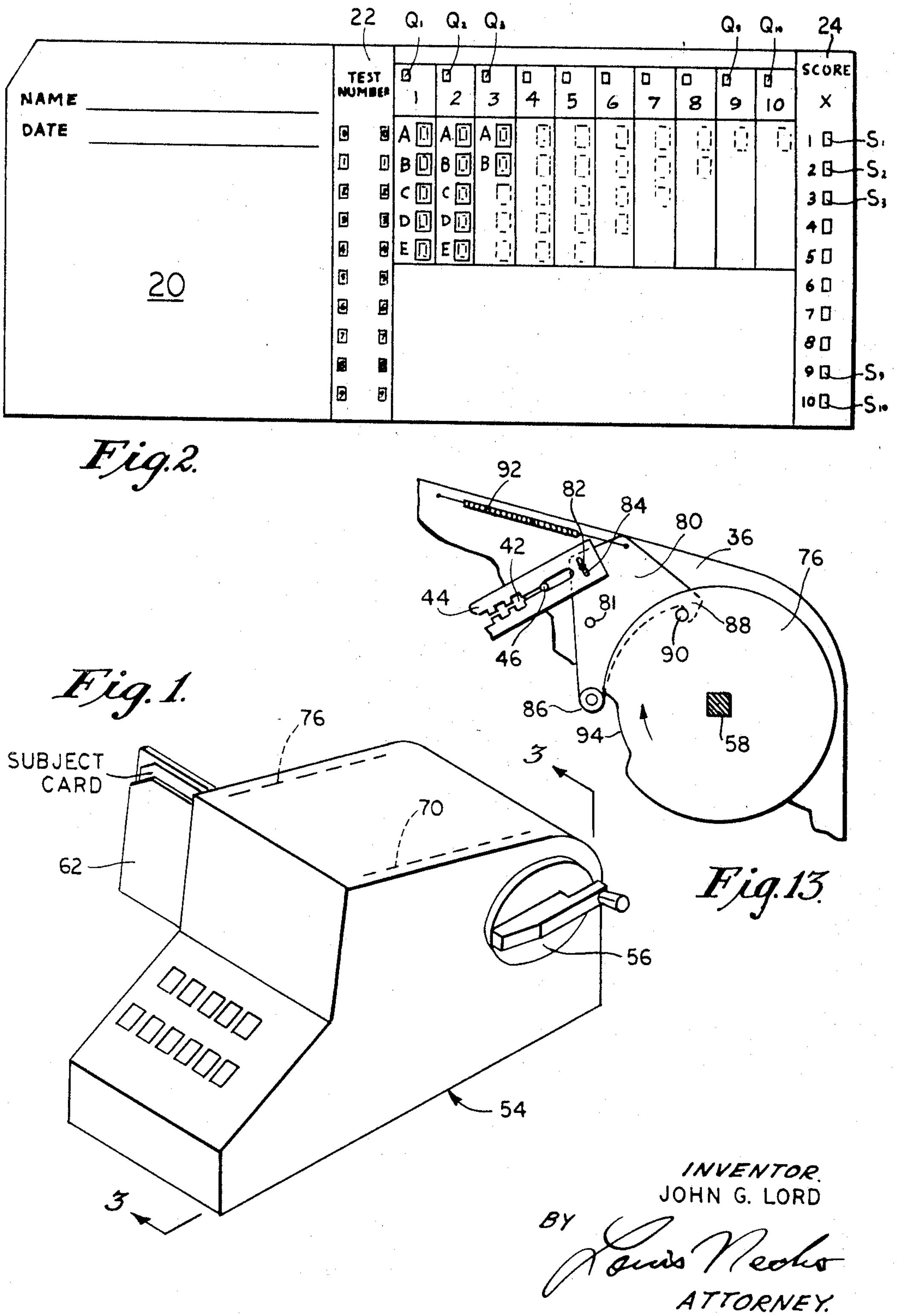
FIG. 1 is a perspective view of an apparatus embodying the invention.
FIG. 2 is a top plan view of a card which is adapted for use in carrying out the invention.
FIG. 13 is a sectional view looking in the direction of line 13—13 on FIG. 4 showing the mechanism which normally locks the apparatus.

In carrying out the invention, two punch cards are used. One is prepunched by the party conducting the test, or the Testor, and one which is to be punched by the party taking the test, or the Testee. Since, for economy and interchangeability, both cards carry the same indicia, only one of the cards is shown in FIG. 2. Also, for convenience, the card which is prepunched by the Testor will be referred to as the Master card and the one punched by the Testee is referred to as Subject card.

As will be seen from FIG. 2, each card includes an area 20 for the name and address of the Testee, and other data, and an area 22 which is marked "Test No." and which bears two columns of prescored areas each numbered from 0 to 9. By punching out one or more of the scored numerals, the card will be given the desired coded information and identification. For example, if the Master card is prepunched at 3 in one column and at 4 in the other column, it will indicate that this is Test No. 34, and so on. This means that the test card must be similarly punched to indicate that the Subject card does correspond to the Master card. Each card also includes a number of horizontally aligned, prescored areas marked Q1 to Q10 to indicate that the card carries questions 1 to 10, and ten vertical columns, each of which contains prescored areas marked A to E which are coded so that the area, or combination of areas, A to E prepunched under a given question by the Testor will give, in binary or other fashion, the correct answer for that question. It follows that, if the areas A to E punched in the Subject card by the Testee match those prepunched by the Testor, the answer to the question will have been correctly answered, and vice versa. It is to be noted that the coded information can be varied without departing from the scope of the invention. For example, area A under question No. 1 can mean "yes" and under question No. 2 it can mean "no," and so on.

The Subject card also has an area 24, which is marked "Score" and which bears a column of prescored areas S1 to S10 which correspond to questions Q1 to Q10. These prescored areas are adapted to be punched by the machine at the end of each test cycle to indicate how many of the questions on a card were correctly answered. For example, if only question Q1 was answered correctly, only area S1 will be punched out. If three questions were answered correctly, only area S3 will be punched out. If eight questions were answered correctly, only area S8 will be punched out, and so on. In other words, the Subject card will be punched at Q1 to Q10 to show which questions were answered correctly, and it will be punched at S1 to S10 to show how many questions were answered correctly.

The apparatus of this invention includes: (1) means for sensing the holes prepunched in area 22 in the Master and in the Subject cards to make sure that the Subject card relates to the same test to which the Master card relates; (2) means for sensing the holes punched at A to E under each question in the Master card and in the Subject card; (3) means, operative only when the pattern of areas A to E punched in the Subject card under any question by the Testee are identical with the holes prepunched in the Master card under that same question by the Testor, to punch the corresponding prescored area Q1 to Q10 to indicate that the question involved was answered correctly; and (4) means, operable at the end of the test cycle, to punch one of prescored areas S1 to S10, to show how many questions were answered correctly. It will be understood that the apparatus has ten combined answer-hole sensing and question-number punching mechanisms, one for each question on the card, that it has two Test number sensing mechanisms, one for each column of test numbers, and only one score punching mechanism.

Figure 14:
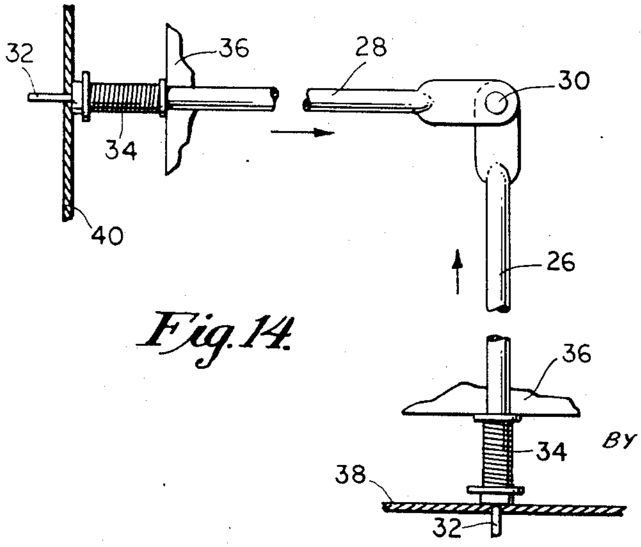
FIG. 14 is an elevational view showing how the probes of my invention are coupled.

The sensing means of this invention which compares the prescored area or areas punched in the Subject card with the corresponding area or areas prepunched in the Master card consists of a pair of probes 26 and 28 which are pivotally connected to a common pin 30, FIG. 14. Probes 26 and 28 each carry a sensing tip 32 which is biased by a spring 34 contained between said tip and an adjacent edge of frame 36 so as to permanently extend through corresponding openings in fixed plates 38 and 40, respectively, which hold the probes perpendicularly to each other and insure proper alignment of tips 32 with the prescored areas in the cards. Since each question has five prescored areas A to E, there will be five pairs of probes for each question. See FIGS. 3, 7, 15 and 16.

Figures 11, 12:
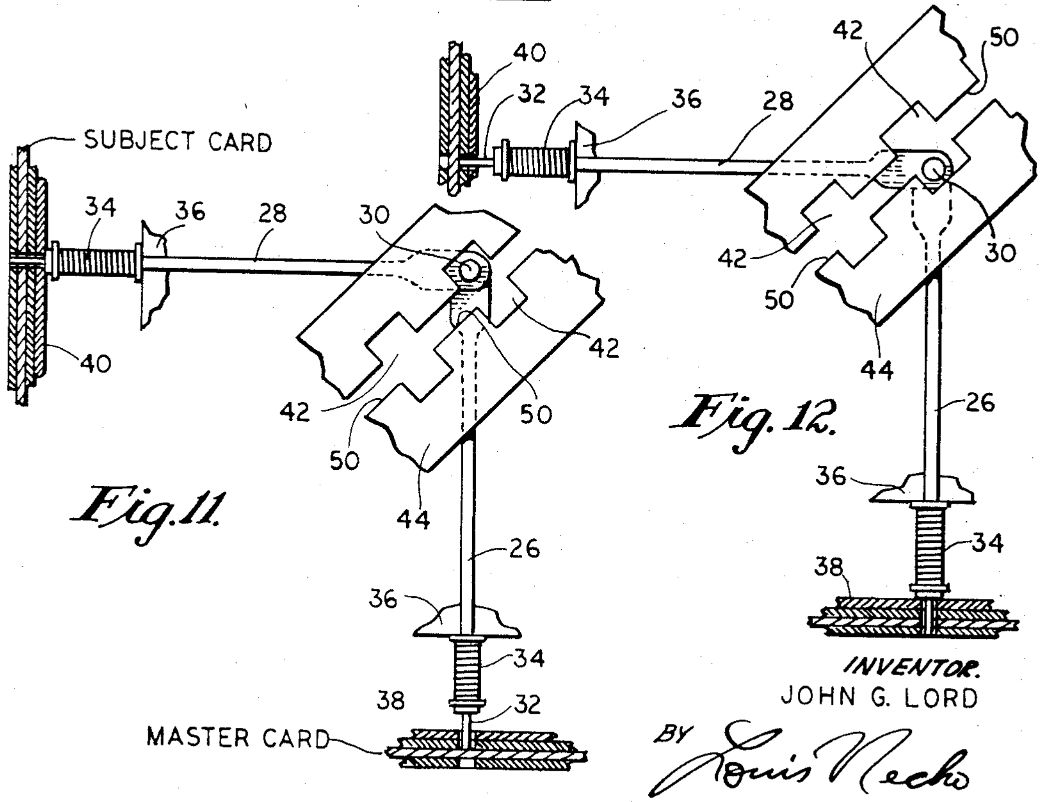
Figure 16:
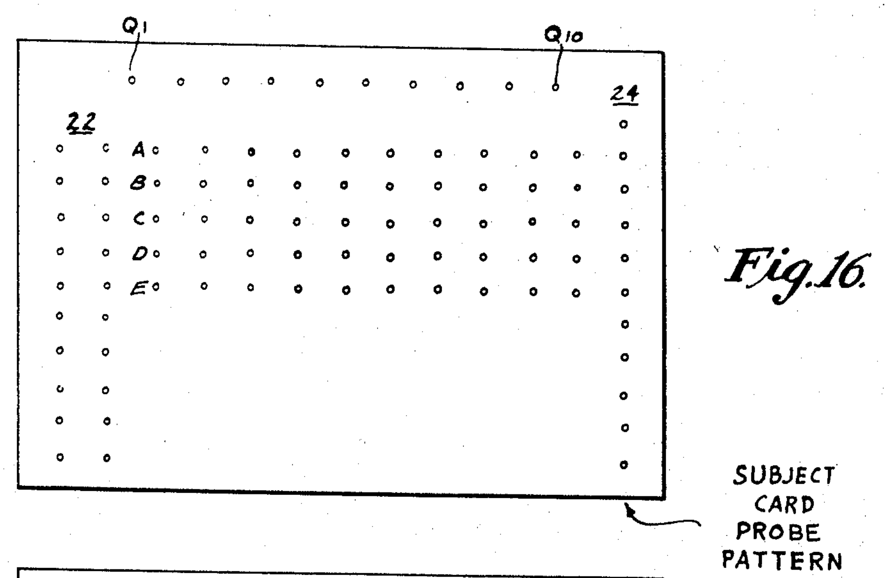
FIG. 16 is a view looking in the direction of line 16—16 in FIG. 3 and showing the pattern of the probes which sense the holes punched in the card by the person taking the test, and the punches for punching additional holes in said card.
Figure 15:
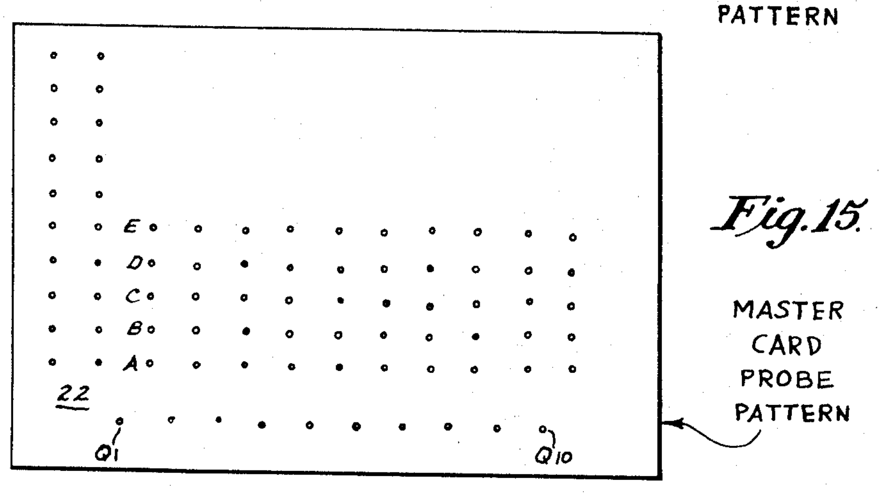
FIG. 15 is a view looking up in the direction of line 15—15 on FIG. 3, and showing the pattern of the probes which sense the holes punched in the card by the examiner, testing.

As can be seen from FIGS. 8 to 12, pin 30 engages a lateral or transverse opening 42 formed in a gate 44 which is slidably mounted to frame 36 as at 45 and 46 for longitudinal movement relative to said pin. As seen from FIG. 8, gate 44 is provided with a series of such lateral openings 42, one for the pin 30 of each pair of probes, and openings 42 are interconnected by relatively narrow longitudinal openings or passages 50. As seen from FIGS. 9 and 10, when the pin 30 of a pair of probes 26 and 28 is centered relative to its opening 42, it will align with passages 50 to either side of the opening, and gate 44 can be movable in the direction of the double-headed arrow 52 in FIG. 9, or FIG. 10. Conversely, if pin 30 is not centered relative to its opening 42 as shown in FIGS. 11 and 12, it will be out of alignment with passages 50, and gate 44 will be immobilized. It follows that, if probe 26 enters a hole in the Master card and if probe 28 finds a corresponding hole in the Subject card, pin 30 will be centered relative to its opening 42 and will register with lower passage 50, and gate 44 will be movable in the direction of arrow 52 in FIGS. 9 and 10. If both cards are imperforate, pin 30 will register with upper passage 50, and gate 44 will still be movable in the direction of arrow 52. But, if probe 26 enters a hole in Master card and if probe 28 finds no corresponding hole in the Subject card, pin 30 will move to the locking position of FIG. 12, and if only probe 28 enters a hole in the Subject card and probe 26 finds no corresponding hole in the Master card, pin 30 will be in locking position of FIG. 11. In both of these positions, gate 44 will be immobilized. It will be understood that the relation shown in FIGS. 9 to 12 which applies to all pairs of probes 26 and 28 which sense the answer-holes, also applies to the test number sensing probes in area 22, in that, if the test number of the Subject card and that of the Master card are the same, or if neither card has a punched test number area, the probes will enter corresponding holes, or will not enter any holes in either card, as the case may be, and pin 30 will be in the releasing position of FIG. 9 or of FIG. 10. Conversely, if the test number of the Master card and that of the Subject card do not match, pin 30 will be in the locking position of FIG. 11 or of FIG. 12, and gate 44 will be immobilized. Gate 44 can be utilized in any desired capacity. To prevent forcible movement of gate 44 even though pin 30 is in the locking position of FIGS. 11 or 12, the pin also engages a hole 37 which is formed in a fixed portion 36 of the frame and which overlies hole 42. As shown in FIG. 7, holes 37 are square and are so oriented that their opposite corners bisect the corresponding sides of holes 42, thereby providing sufficient travel for pin 30 when the parts are in the releasing position of FIG. 9 or 10. Conversely, if a pin is to one side or the other of a line connecting the opposite corners of hole 37, the pin will be rigidly immobilized by the frame and gate 44 cannot be forcibly moved without damaging the apparatus.

The means for comparing the punched out areas of the numerals in test area 22 of the Subject card with those in the Master card to make sure that the Subject card is the counterpart of the Master card, includes two columns of ten pairs of probes like probes 26 and 28. These probes are adapted to enter the holes prepunched in test area 22 in the Master card by the Testor and those punched in the Subject card by the Testee, with the results previously discussed in connection with FIGS. 9 to 12. It will be understood that each column of probes has associated with it a gate 44 and that this gate will have ten openings 42 formed therein, one for each pin 30 of the ten pairs of probes. Obviously, if the perforate and the imperforate areas of both cards do not correspond, the apparatus will be locked, as previously described, and vice versa. As above intimated, the means for comparing the answer areas A to E under each question includes five pairs of probes 26 and 28 which are adapted to sense corresponding areas of the Master and Subject cards, and one associated gate 44 which has five openings 42 for receiving the connecting pins 30 of said five pairs of probes. As hereinafter set forth, each gate 44 controls the punching means which indicates the respective question has been correctly answered.

Figures 5, 6, 7, 8:
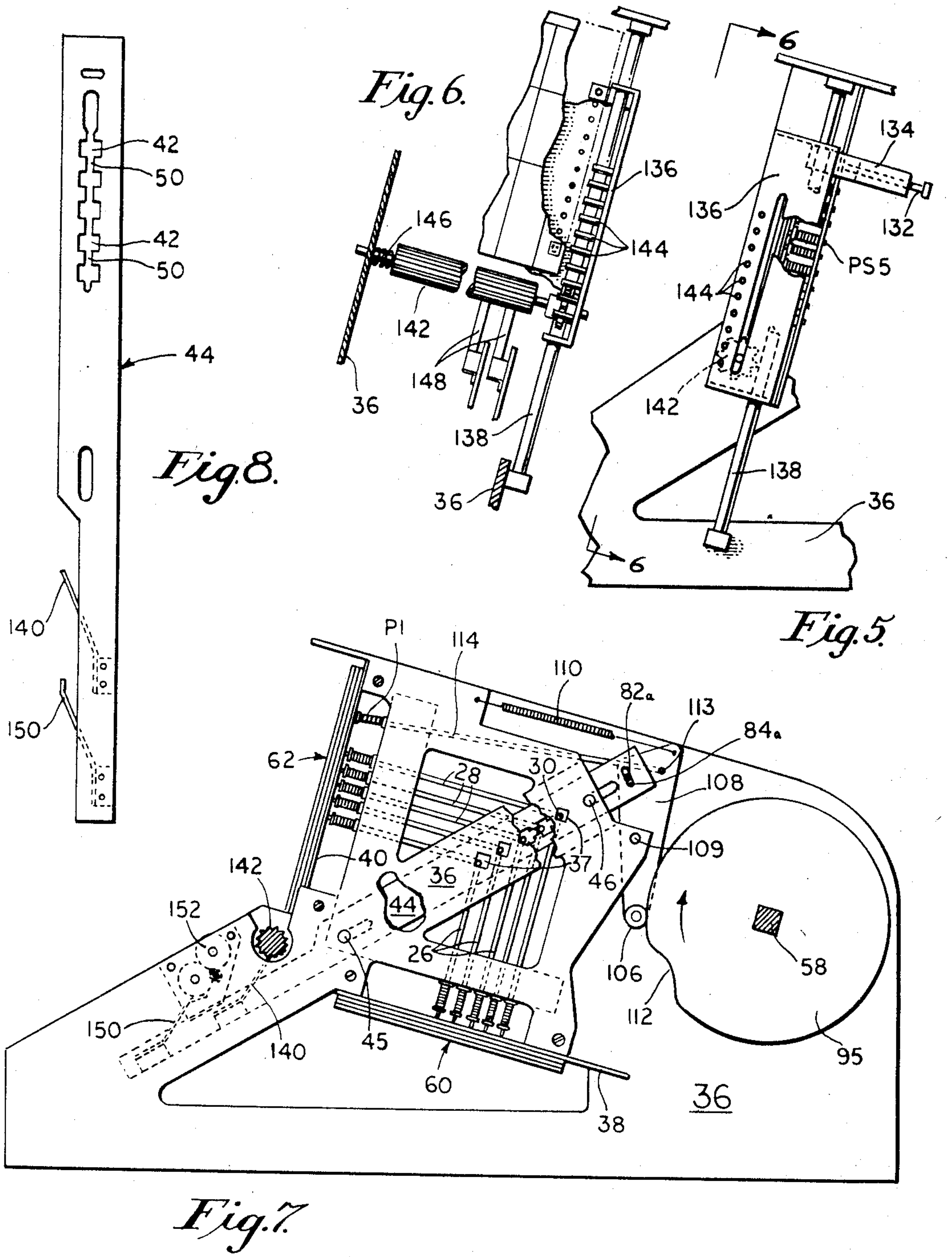
FIG. 5 is a fragmentary view, partly in vertical section and partly in side elevation showing the scoring mechanism, that is, the mechanism which indicates the number of correctly answered questions.
FIG. 6 is a view looking in the direction of line 6—6 on FIG. 5.
FIG. 7 is a sectional view looking in the direction of line 7—7 on FIG. 4.
FIG. 8 is a side elevational view of the actuating member which operates the marking and scoring devices only in response to a correctly answered question.
Figures 9, 10:
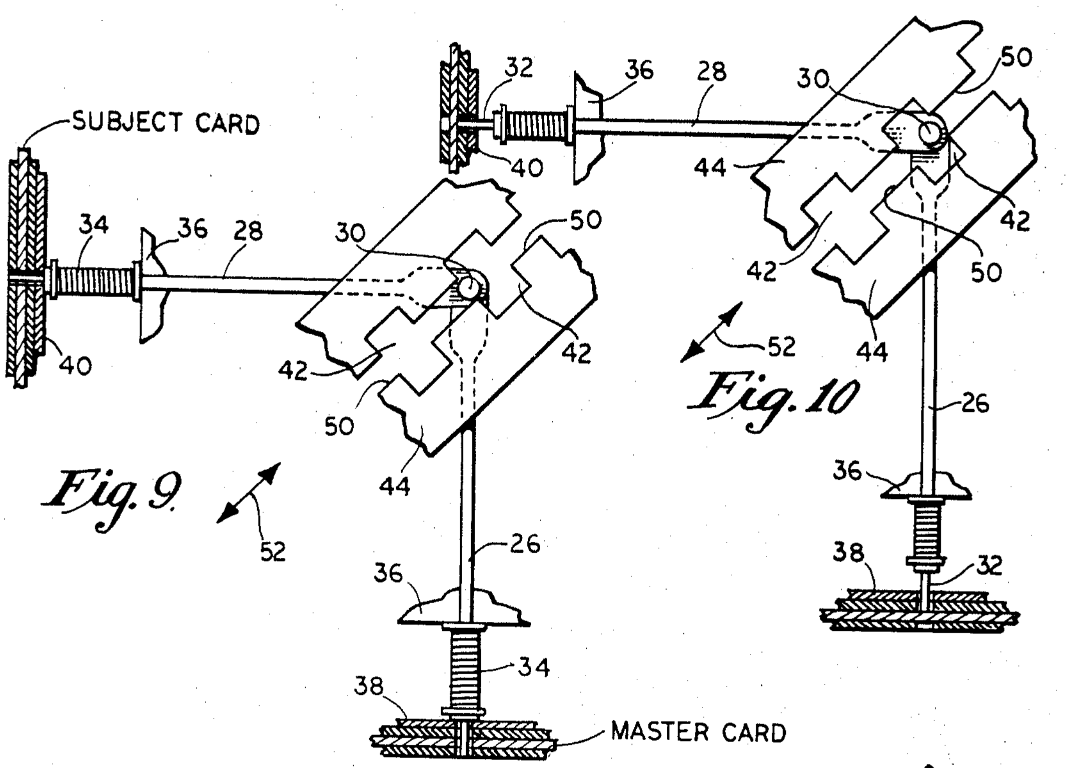
FIGS. 9 through 12 are enlarged fragmentary vertical sectional views showing how the apparatus responds to correctly and to incorrectly answered questions.

The means for punching the hole at Q1 to Q10 when a question is answered correctly consists of ten punches P1 to P10 (one for each question Q1 to Q10), said means activating a given punch only if the corresponding question has been correctly answered (see FIG. 7).

Figures 17, 18:
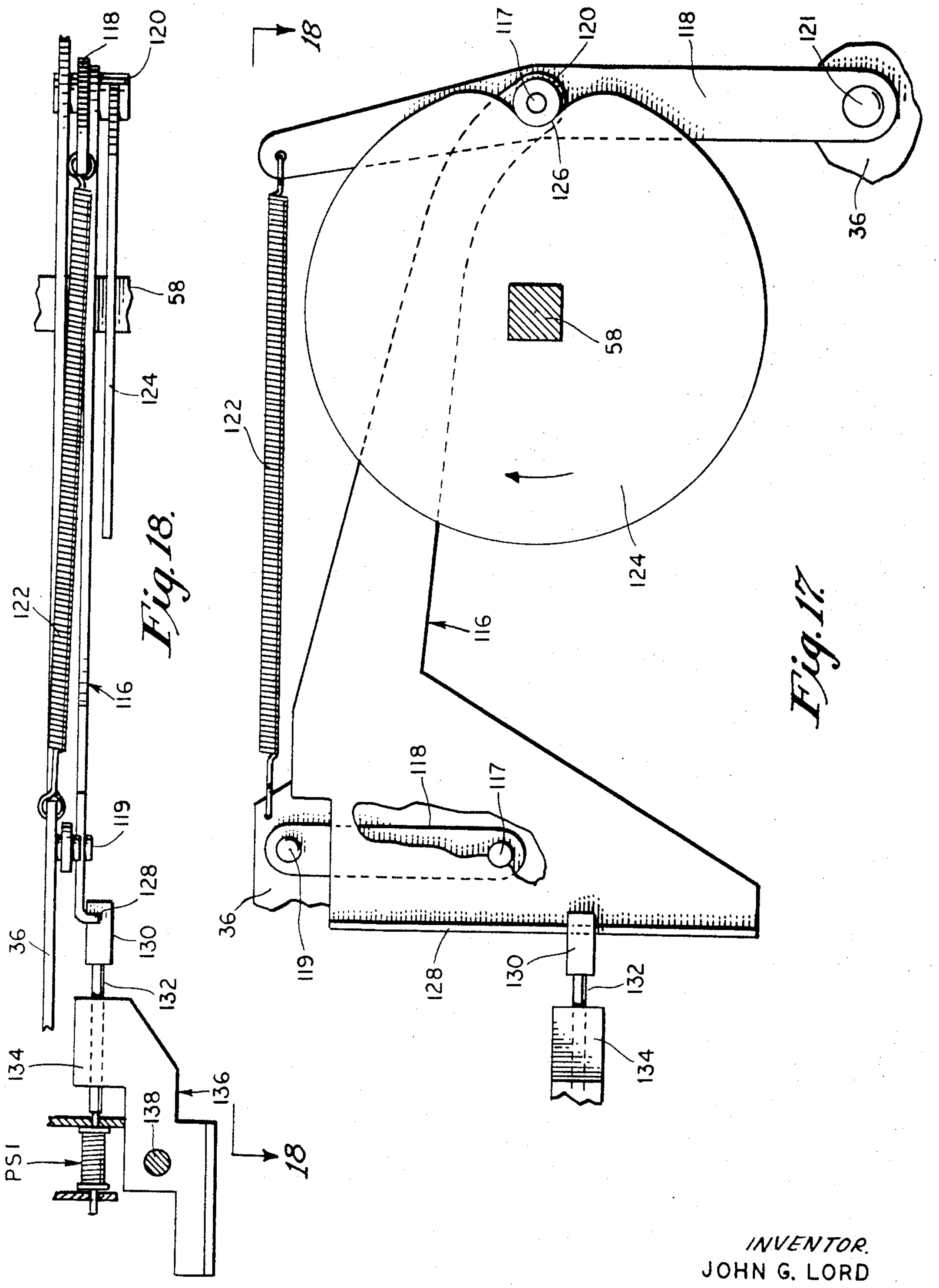
FIG. 17 is a view looking in the direction of line 17—17 on FIG. 4.
FIG. 18 is a view looking in the direction of line 18—18 on FIG. 17.

The means for punching one of areas S1 to S10 to indicate the total number of correct answers includes: (1) a row of vertically fixed, but horizontally movable, punch heads PS1 to PS10, which permanently register with prescored areas S1 to S10; (2) punch head actuating means movable into alignment with the punch head which represents the number of the last correctly answered question; and (3) means for activating said actuating means to push said punch head through the corresponding area S1 to S10 (see FIGS. 3 and 18).

Figures 3, 4:
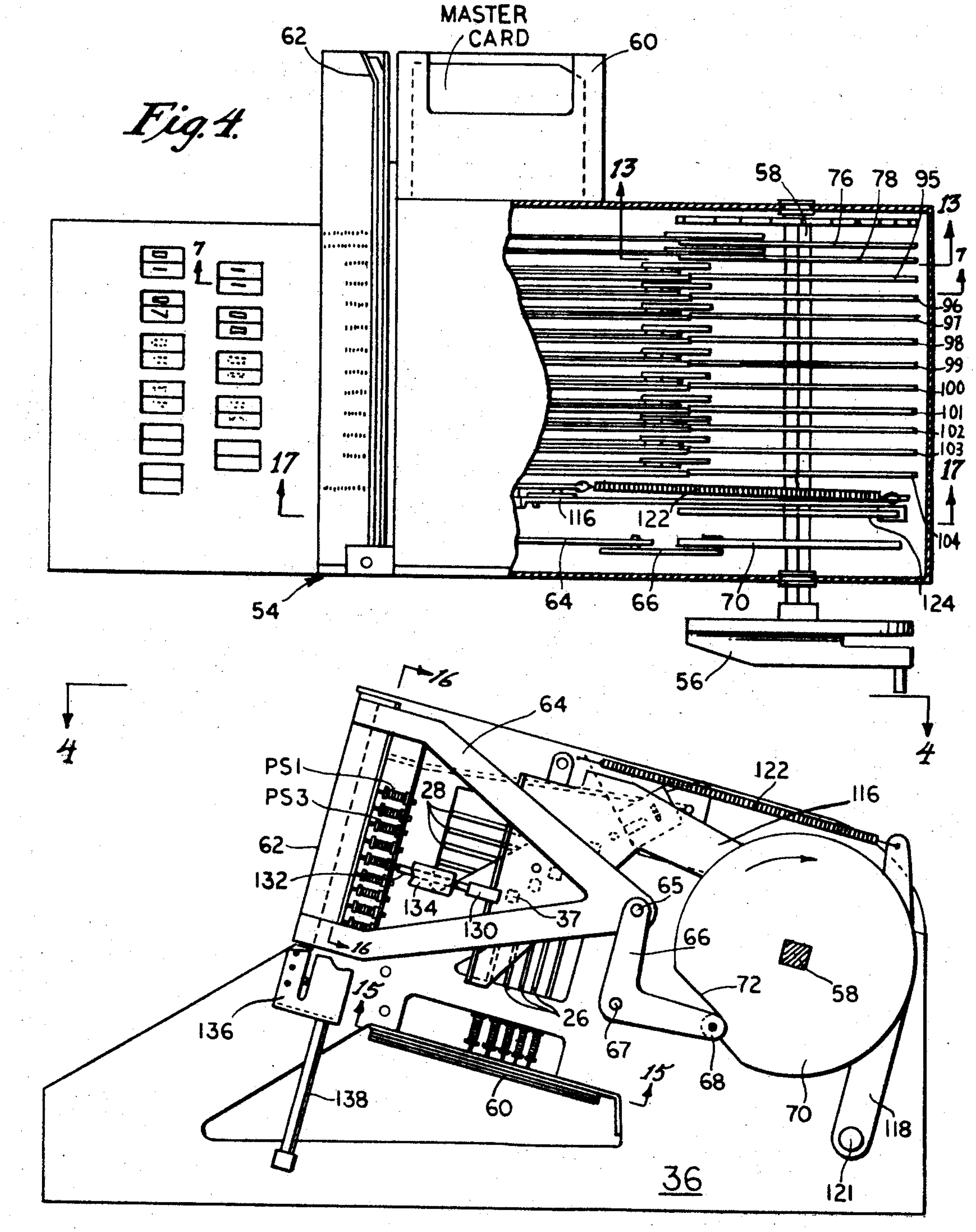
FIG. 3 is a sectional view looking in the direction of line 3—3 on FIG. 1.
FIG. 4 is a top plan view looking in the direction of line 4—4 on FIG. 3.

To present the Master card to probes 26, I provide a movable platform 60 which is lowered to receive the card and raised to bring the card against plate 38 and into contact with tips 32 of the probes, FIG. 3. Platform 60 is movable manually or in any other suitable manner.

To present the Subject card to probes 28, I provide a carriage 62 which is biased by a spring not shown, to an open position, or to the left in FIG. 3. Carriage 62 is supported by a frame 64 which is pivoted at 65 to one end of a bell crank lever 66 which is pivoted to one end of a shaft 67. The other end of bell crank lever 66 carries a follower 68 which rides on the circular periphery of disc 70 or on cam surface 72 thereof. It will be understood that, to prevent binding, another frame 64 and bell crank 66 are employed at the other end of shaft 67 but, since they are identical in structure and in operation, they are not shown nor described. As can best be seen in FIG. 3, engagement of follower 68 with the circular periphery of disc 70 causes bell crank 66 to rotate in clockwise direction, thereby moving carriage 62 to its closed position or to the right in FIG. 3, to bring the Subject card into contact with tips 32 of probes 28. In other words, the first step is to place the Master card on platform 60 and to move it into contact with probes 26; and the second step is to present the Subject card to probes 28 by placing the card in carriage 62 and turning crank 56 as set forth above. It will be noted that, when in position, the Master and the Subject cards will be in planes which are at right angles and that presentation of the Master and Subject cards to probes 26 and 28 respectively, causes the probes to move to one of the positions of FIGS. 9 to 12, according to the identity, or lack of identity, of the Subject card with the Master card.

Figure 19:
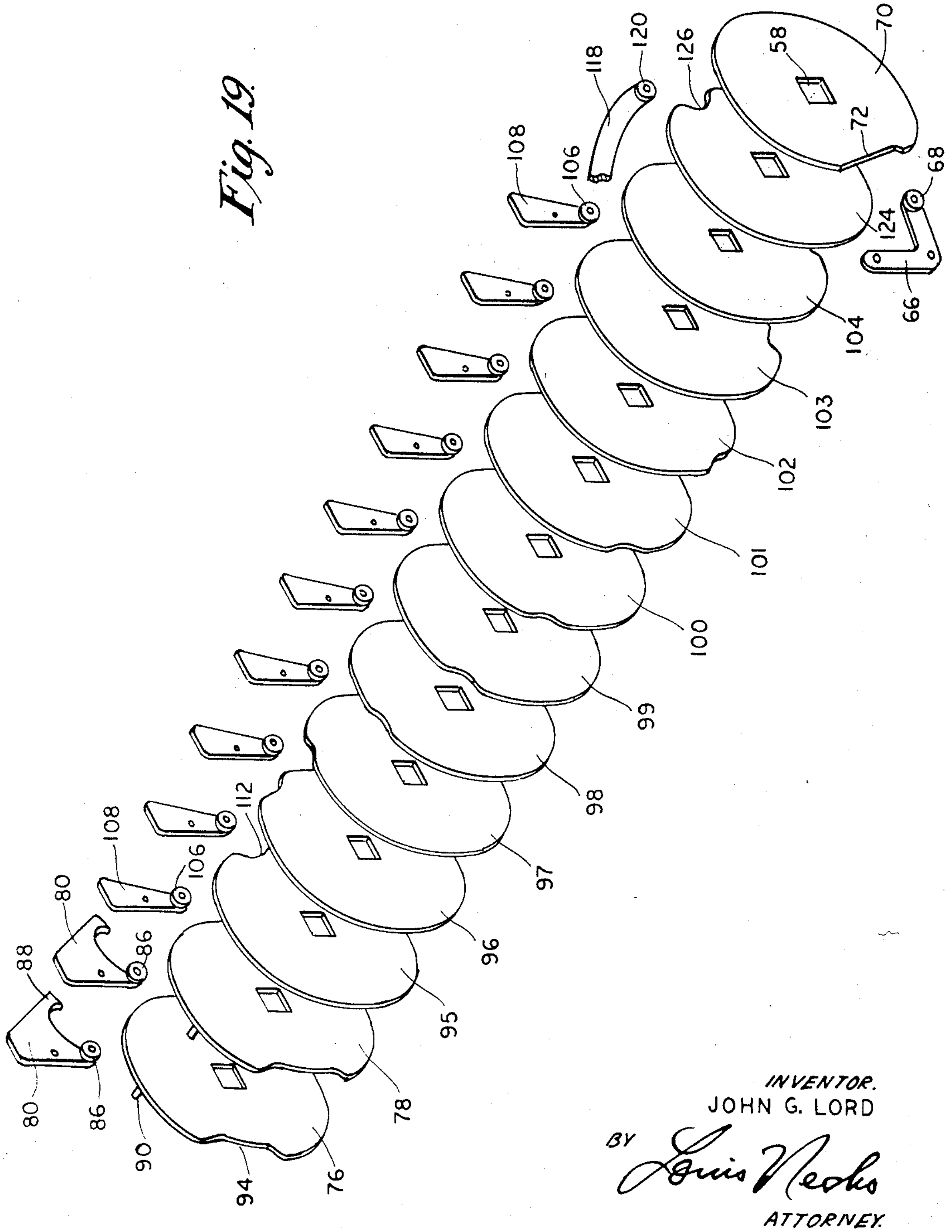
FIG. 19 is an enlarged, exploded, diagrammatic view of the arrangement of the cams embodied in the invention.

As can be seen from FIGS. 1 and 4, the apparatus illustrated includes a housing 54 in which is journalled a shaft 58 which extends the width of housing 54 and which carries fourteen spaced discs which are shown exploded in FIG. 19. The shaft is rotatable by a crank 56 which is accessible from without the housing. Each disc has a recess peripheral cam surface, and it will be noted that the cam surfaces are progressively angularly displaced, whereby rotation of shaft 58 through 360° will cause all the cam surfaces to function in succession as hereinafter set forth.

Since a complete testing cycle involves a complete rotation of shaft 58, I provide means to prevent further rotation of shaft 58 once carriage 62 is in its closed position, unless the test number in area 22 on the Subject card corresponds to the test number in area 22 on the Master card. It will be remembered that there are two sets of probes and two gates, one for each column of numerals in area 22, and that discs 76 and 78 are associated with the columns. But since both columns are identical, it is thought that a description of the first one of them will suffice. By referring to FIG. 13, it will be seen that a bell crank lever 80 is pivoted at 81 to frame 36 and carries a pin 82 which engages slot 84 in the upper end of corresponding gate 44. Lever 80 also carries a roller 86, which engages disc 76, and a hook 88 which is disposed in the path of movement of a lug 90 carried by disc 76. Lever 80 is biased to the left or counter-clockwise, as viewed in FIG. 13, by spring 92, connected to frame 36, to retain roller 86 in engagement with disc 76. When shaft 58 has been sufficiently rotated to close carriage 62, disc 76 will have been turned to the position of FIG. 13 in which lug 90 engages hook 88, and roller 86 is about to engage cam surface 94 of disc 76. It will be remembered that if the Subject and Master cards correspond, either because of identical holes or identical imperforate areas, probes 26 and 28 will move to the releasing position of FIG. 9 or 10 in which gate 44 is free to move. However, if the Subject and Master cards do not correspond, the probes will assume the locking position of FIG. 11 or 12, in which gate 44 is prevented from moving as above explained. Thus, if the test numbers do not match, gate 44, lever 80, disc 76, and shaft 58 will be immobilized. If, however, the test numbers do match, gate 44 will be free to move and since it is connected to lever 80 by pin 82, lever 80 can be rotated by the action of spring 92 to move hook 88 out of the path of lug 90 as roller 86 moves on to cam surface 94 to allow disc 76 and hence shaft 58 to rotate. It should be noted that one set of probes for one column of numerals in area 22 is controlled by the above described disc 76 and that the other set of probes for the other column of test numerals is controlled by a disc 78 which is only shown in FIG. 19, and which, being identical with disc 76, is not further described.

The apparatus also includes one combined answer hole-sensing and question number-punching mechanism for each question. Each of these mechanisms is controlled by a separate disc. In the present case, the cards have ten questions and therefore there are ten discs 95, 96, 97, 98, 99, 100, 101, 102, 103, and 104, associated with questions Q1 through Q10 respectively. See FIG. 19.

Since all of the mechanisms are identical in structure and operation, it is thought that only one such mechanism, such as that which is associated with question number 1, need be described. By reference to FIG. 7, it will be seen that shaft 58 carries disc 95 which is engaged by roller 106 of a bell crank lever 108 which is pivoted at 109 to frame 36 and which is biased, in counter-clockwise direction by spring 110 which is carried by frame 36. Like bell crank lever 80 of disc 76, bell crank lever 108 of disc 95 carries a pin **82*a* which engages slot 84*a* in associated gate 44. Also, like bell crank lever 80, bell crank lever 108 cannot move if gate 44 is immobilized by the pin of any pair of probes assuming the locking position of FIG. 11 or 12. Bell crank 108 has pivoted to it, as at 113, a punch 114 which is adapted to punch a hole in prescored area Q1, if the first question was answered correctly. If the question was answered correctly, gate 44 is released; roller 106 can drop on to cam surface 112 as spring 110 rotates bell crank 108 counter-clockwise to activate punch 114 to punch a hole at Q1 to indicate that question was answered correctly. As shaft 58 is progressively turned, the remaining discs 96 to 104 will operate on questions Q2 to Q10 in the manner just described. In case the question is incorrectly answered, roller 106 cannot drop on to cam surface 112 and bell crank 108 and punch 114 will remain immobilized. It will be noted that the immobilization of any one bell crank 108 only immobilizes the corresponding punch 114** and has no effect on the operation of the mechanisms assigned to other questions.

To punch a prescored area under area 24 to indicate the number of questions which were answered correctly, I provide the mechanism which is shown in FIGS. 3, 5, 6, 17 and 18, and which includes a bracket 116, one end of which is pivoted at 117 to an arm 118 which is pivoted at 119 to a part of the frame 36. The other end of bracket 116 is pivoted on a pin 117 which rotatably carries lever 118 and roller 120. Lever 118 is pivoted at 121 to frame 36 and is biased in counter-clockwise direction by spring 122 to keep roller 120 in constant contact with disc 124, which is carried by shaft 58. By this arrangement, as long as roller 120 rides on the circular, or high, periphery of disc 124, bracket 116 will be in a position to the right of that which it occupies in FIGS. 17 and 18. But, when roller 120 drops on to cam surface 126, spring 122 acting on lever 118, moves bracket 116 to the left, or to the position shown in FIGS. 17 and 18. Bracket 116 has a vertical edge 128 on which is slidable a carriage 130 which carries a punch head actuating member or "hammer" 132, adapted to drive the aligning punch head PS1 to PS10. Hammer 132 is slidable in a guide sleeve 134 which is integral with a support housing 136 which is slidably mounted on a shaft 138. To move hammer 132 down from its initial zero position into alignment with PS1, FIG. 5, in response to one correctly answered question, associated gate 44 is provided with a pawl 140, FIG. 8, which engages and rotates an elongated cylindrical gear 142, FIGS. 6 and 7, and through one step for each reciprocation of said gate as shown by the double-headed arrow 52 in FIGS. 9 and 10. Gear 142 engages a rack 144 which is carried by support housing 136, FIG. 6, whereby rotation of gear 142 will move housing 136, hammer 132, and carriage 130, down to a position in which hammer 132 registers with punch head PS1 which in turn aligns with prescored area S1. If the rest of the questions are not answered correctly, their gates 44 will not move, and gear 142 will not rotate. If two more questions are answered correctly, housing 136 will move down into registration with punch head PS3, and so on. After the last question has been sensed, further rotation of shaft 58 causes roller 120 to drop on to cam surface 126 to allow spring 122 to move bracket 116 to the left, as viewed in FIG. 18, to push hammer 132 against the registering punch head PS3 to punch a hole at prescored area S1 or S3 to indicate that one or three out of ten questions were answered correctly. Counter rotation of gear 142 during operation of the apparatus is prevented by dogs 148. The rotation of gear 142 which moves carriage 136 downwardly, also loads spring 146 which, when dogs 148 are disengaged from gear 142 by any suitable means, rotates gear 142 in the reverse direction and thus raises carriage 136 to its upper position in which hammer 132 again registers with the area 24 above prescored area S1.

Each gate 44 is also provided with a pawl 150 which is adapted to turn a counter 152, FIG. 7, to indicate the total number of correct answers for an entire testing programme, which may involve a large number of test cards.

The operation of this apparatus is as follows:

The Testor places the pre-punched Master card in carriage 60 and moves it against plate 38 to bring it into contact with the tips of probes 26. The Testee is given a card which is un-punched except in the Test area 22 to show the number of the test, or set of questions. The Testee punches the prescored areas A to E, below each question Q1 to Q10, to indicate his concept of the answer, or answers, to each question; he then puts the card in carriage 62, and turns crank 56 which causes cam 70 to bring the card into abutment against plate 40 through which the tips 32 of all the probes 28 pass. If the Testee, having more than one card on hand, puts the wrong card into the machine, the probes associated with either, or both, of discs 76 and 78 will assume the locking position of either FIG. 11 or 12, and the corresponding gate or gates, will not move. This means that the entire apparatus will be immobilized. If the test numbers match, the probes will be in the releasing position and the Testee can turn crank 56 to rotate shaft 58 and operate the answer-hole sensing and question-number punching mechanisms which are controlled by discs 95 to 104.

At the end of the testing cycle, by inspection, it will be seen that the punched areas at Q1 to Q10, and at S1 to S10, will indicate to the Testor which questions were answered correctly, as well as how many questions were answered correctly by each Testee. Also, the counters will indicate to the Testor, the total number of correct answers to each question for the entire testing cycle.

For the purpose of this invention, the pins which connect the pairs of probes could move in individual transverse polygonal openings, each of which has individual longitudinal openings extending from opposite sides thereof, in the direction of the lnogitudinal axis of the corresponding gate. These longitudinal openings are long enough to permit the desired longitudinal movement of each gate relative to its pins. But for economy and lightness, the various openings 42 are interconnected by a continuous longitudinal opening or passage 50, as best shown in FIG. 8.

As can be seen from the above disclosure, the apparatus of this invention has been described with reference to classroom or personnel-testing in which a testing card comprising ten questions, each question having five multiple choices, is used. However, it is pointed out that the present invention is not intended to be limited to such uses only as mentioned or to such a specific combination of questions and answers, but that changes and modifications may be made thereto without departing from the underlying idea of the invention.

What I claim is:

1. A machine for comparing the presence, or absence, of a hole in a predetermined area in a Master card prepared by one person, with the presence, or absence, of a hole on a corresponding predetermined area in a Subject card prepared by another person, said machine including:

an elongated gate having a longitudinal opening and lateral openings on opposite sides of said longitudinal opening and communicating therewith intermediate the ends thereof, means mounting said gate for longitudinal reciprocal movement, a pair of probes, means mounting said probes for movement in angularly related planes, a pin connecting corresponding ends of said probes and selectively engageable with said longitudinal opening and with either of said lateral openings, said longitudinal opening receiving said pin and permitting appreciable longitudinal movement of said gate relative to said pin, said lateral openings receiving said pin to permit movement of said pin out of alignment with said longitudinal opening and preventing appreciable longitudinal movement of said gate when said pin is out of alignment with said longitudinal opening, means for presenting said Master card to one of said probes, and means for presenting said Subject card to the other of said probes, whereby the identical presence, or absence, of a hole in both of said predetermined areas locates said pin in alignment with said longitudinal opening and permits longitudinal movement of said gate, and whereby the presence of a hole in the predetermined area in only one of said cards moves said pin out of alignment with said longitudinal opening and into either of said lateral openings to prevent longitudinal movement of said gate.

2. The machine defined in claim 1 and a shaft rotatable to perform a given operation, and locking means operable to prevent rotation of said shaft when said gate is immobilized.

3. The machine defined in claim 1 and a counter located in the path of movement of said gate and operated by said movement.

4. The machine defined in claim 1 and means operable upon movement of said gate to modify the Subject card to indicate the identical presence or absence of a hole in both of said predetermined areas.

5. A machine for comparing the presence, or absence, of holes in a first card disposed in a first plane, with the presence, or absence, of corresponding holes in a second card disposed in a second plane which is substantially at a right angle to said first plane, said machine including:

a first set of probes disposed in a plane substantially normal to the plane of said first card, a second set of probes disposed in a plane substantially normal to the plane of said second card, an elongated gate having longitudinal openings and lateral, polygonal openings on opposite sides of each of said longitudinal openings and communicating therewith intermediate the ends thereof, means, mounting said gate for longitudinal, reciprocal movement, pins selectively engageable with said longitudinal and with either of said lateral openings and connecting corresponding ends of corresponding probes of said first and second sets of probes to form pairs of probes, the free ends of said pairs of probes being adjacent to said first and second cards, respectively, said longitudinal openings receiving said pins and permitting appreciable longitudinal movement of said gate when all of said pins are in alignment with said longitudinal openings, said lateral openings receiving said pins to permit movement of said pins out of alignment with said longitudinal openings, and preventing appreciable longitudinal movement of said gate when at least one of said pins is out of alignment with the corresponding longitudinal opening, means presenting said first and second cards to the free ends of said pair of probes, respectively, whereby the identical presence, or absence, of corresponding holes in both of said cards locates said pins in alignment with said longitudinal openings and permits longitudinal movement of said gate, and whereby entry of only one probe of any one pair of probes into a hole in only one of said cards moves the corresponding pin out of alignment with the corresponding longitudinal opening and into either of the corresponding lateral openings to prevent appreciable longitudinal movement of said gate.

6. A machine for comparing the test number and the answers to a plurality of questions as indicated by holes punched in predetermined areas in a Subject card by a Testee, with the test number and answers as indicated by holes prepunched in corresponding predetermined areas in a Master card by a Testor, said Master card having first columns of indicia which are selectively prepunched by the Testor to indicate the number of a given test, and second columns of indicia, one for each question, which are selectively prepunched by the Testor to indicate the required answers, said Subject card having identical columns of indicia which are to be punched by the Testee, said machine including:

a first set of test-number sensing probes, one for each test number in the Master card, and a second set of answer-hole sensing probes, one for each possible answer in each said Master card, a third set of test-number sensing probes, one for each test number in the Subject card, and a fourth set of answer-hole sensing probes, one for each possible answer in said Subject card, means mounting said first and second sets of probes in one plane, means mounting said third and fourth groups of probes in another plane which is substantially at a right angle to said one plane, pins pivotally connecting corresponding ends of corresponding probes of said first and third sets of probes to form a first group of pairs of probes, pins pivotally connecting corresponding ends of corresponding probes of said second and fourth sets of probes to form a second group of pairs of probes, elongated gates, one of each of said groups, each gate having a plurality of longitudinal openings and lateral, polygonal openings on opposite sides of each of said longitudinal openings and communicating therewith intermediate the ends thereof, means mounting said gates for longitudinal, reciprocal movement, said pins being selectively engageable with said longitudinal openings and with either of said lateral openings, said longitudinal openings receiving said pins and permitting appreciable longitudinal movement of the corresponding gate when all of said pins are in alignment with said longitudinal openings, said lateral openings receiving said pins to permit movement of said pins out of alignment with said longitudinal openings and preventing appreciable longitudinal movement of the corresponding gate when at least one of said pins is out of alignment with the corresponding longitudinal opening, means for presenting said Master card to the probes in said one plane, means for presenting said Subject card to the probes in said other plane, whereby the identical presence, or absence, of the holes in both of said predetermined areas locates said pins in alignment with said longitudinal openings and permits appreciable movement of said gates, and whereby the entry of only one probe of any pair of probes, of any group of pairs of probes, into a hole in only one of said cards, moves the corresponding pin out of alignment with the corresponding longitudinal opening and into either of the corresponding lateral openings to prevent appreciable longitudinal movement of the respective gate.

7. A machine for comparing the test number and the answers to a plurality of questions as indicated by holes punched in predetermined areas in a Subject card disposed in a first plane, with the test number and the answers as indicated by holes punched in corresponding predetermined areas in a Master card disposed in a second plane which is substantially at a right angle to said first plane, and for punching additional holes to indicate which questions were answered correctly, said machine including:

a first set of probes for sensing the presence, or absence, of test-number holes in the Master card, a second set of probes for sensing the presence, or absence, of test-number holes in the Subject card, pins pivotally connecting the corresponding, adjacent ends of corresponding probes of said first and second sets of probes to form a first group of pairs of probes, a third set of probes for sensing the presence, or absence, of answer holes in the Master card, a fourth set of probes for sensing the presence, or absence, of answer holes in the Subject card, pins pivotally connecting the corresponding, adjacent ends of corresponding probes of said third and fourth sets of probes to form a second group of pairs of probes, a hole punching mechanism for punching a hole in the Subject card to indicate which questions were answered correctly, elongated gates, one for each of said groups of pairs of probes, means mounting said gates for longitudinal, reciprocal movement, each gate having a plurality of polygonal, longitudinal openings and lateral openings on opposite sides of each of said longitudinal openings and communicating threrewith intermediate the ends thereof, said longitudinal openings receiving said pins and permitting appreciable longitudinal movement of the corresponding gate when all of said pins are in alignment with said longitudinal openings, said lateral openings receiving said pins to permit movement of said pins out of alignment with said longitudinal openings and preventing appreciable longitudinal movement of the corresponding gate when at least one of said pins is out of alignment with the corresponding opening, means for presenting said Master card to said first and third sets of probes, means for presenting said Subject card to said second and fourth sets of probes, whereby the identical presence, or absence, of all the holes in both of said predetermined areas locates said pins in alignment with said longitudinal openings and permits appreciable longitudinal movement of said gate, and whereby the entry of only one probe of any pair of probes, of any group of pairs of probes, into a hole in only one of said cards moves the corresponding pin out of alignment with the corresponding longitudinal opening and into either of the corresponding lateral openings to prevent appreciable longitudinal movement of the respective gate, a rotatable shaft, and a punching mechanism operatively connecting said gate of said second group of pairs of probes to said shaft and operable, upon rotation of said shaft and upon longitudinal movement of said gate, to punch a hole in said Subject card to indicate that the corresponding question was answered correctly.

8. The machine defined in claim 7 wherein said punching mechanism includes:

a disc rotatable with said shaft and having a cam surface thereon, a bell crank connected to said gate and carrying a roller adapted to engage said cam surface upon longitudinal movement of said gate, a punch connected to said bell crank, and a spring connected to said bell crank and biasing said punch toward said Subject card, whereby engagement of said roller with said cam surface allows said punch to pierce the Subject card.

9. A machine for comparing the number of the test being given and the answers to the questions constituting the test as indicated by holes punched in predetermined areas of a Subject card disposed in a first plane, with the test number and the answers as indicated by holes prepunched in corresponding predetermined areas of a Master card disposed in a second plane which is substantially at a right angle to said first plane, and for indicating the questions answered correctly, said machine including:

a first set of probes for sensing the presence, or absence, of test-number holes in the Master card, a second set of probes for sensing the presence, or absence, of test-number holes in the Subject card,
pins pivotally connecting the corresponding, adjacent ends of corresponding probes of said first and second sets of probes to form a first group of pairs of probes,
an elongated gate for said first group of pairs of probes,
means mounting said gate for longitudinal movement to a first effective position and to a second ineffective position,
said gate having a plurality of longitudinal openings and lateral polygonal openings on opposite sides of each of said longitudinal openings and commuicating therewith intermediate the ends thereof,
said longitudinal openings receiving said pins and permitting longitudinal movement of said gate to its second position only when all of the pins of said first group are in alignment with said longitudinal openings,
said lateral openings receiving said pins to permit movement of said pins out of alignment with said longitudinal openings and preventing movement of said gate to its second position when at least one of said pins is out of alignment with the corresponding longitudinal opening,
a third set of probes for sensing the presence, or absence, of answer holes in the Master card,
a fourth set of probes for sensing the presence, or absence, of answer holes in the Subject card,
pins pivotally connecting the corresponding, adjacent ends of corresponding probes of said third and fourth sets of probes to form a second group of pairs of probes,
means for presenting the Master card to the first set of probes,
means for presenting the Subject card to the second set of probes,
whereby the identical presence, or absence, of corresponding test-number holes locates the pins of said first group of pairs of probes in alignment with said longitudinal openings and permits appreciable movement of said gate, and
whereby the entry of only one probe of any pair of probes of said first group, into a hole in either card moves the corresponding pin out of alignment with the corresponding longitudinal opening and into either of the corresponding lateral openings to prevent appreciable longitudinal movement of said gate,
a rotary shaft,
card modifying means operatively connected to said second group of pairs of probes and to said shaft and operable upon rotation of said shaft to indicate the identity of corresponding answer holes in both of said cards, and
locking means for preventing rotation of said shaft when any pin of said first group of pairs of pins is out of alignment with its longitudinal opening in said gate.

10. The machine defined in claim 9 in which said locking means includes:
a disc rotatable with said shaft and having a cam surface thereon,
a bell crank lever connected to the gate of said first group of pairs of probes,
a roller carried by said lever and adapted to engage said cam surface,
a lug carried by said disc,
a hook carried by said lever and disposed in the path of movement of said lug when said gate is in its first position,
a spring connected to said lever and biasing said roller against said disc,
whereby, upon movement of said gate, said roller engages said cam surface to allow movement of said hook out of the path of said lug.

11. The machine defined in claim 9 wherein said subject card includes a column of score indicia to be selectively punched by the machine to indicate the total number of correct answers, and
a score punching mechanism including:
a vertically fixed and horizontally movable punch aligning with each of said score indicia,
a movable punch arm initially aligning with the uppermost of said punches,
means operable upon each movement of a gate of said second group of pairs of probes to move said punch arm one step downwardly and into alignment with the next of said punches, and
actuating means operable immediately prior to the end of a complete revolution of said shaft to move said punch arm into and out of engagement with the aligning punch to pierce the corresponding score indica.

References Cited

UNITED STATES PATENTS

| | | | |
|---|---|---|---|
| 2,041,758 | 5/1936 | Harding | 35—48 |
| 3,324,576 | 6/1967 | Shaw et al. | 35—48 |
| 3,346,970 | 10/1967 | Charbonneaux et al. | 35—48 |

RICHARD B. WILKINSON, *Primary Examiner.*
STEPHEN J. TOMSKY, *Assistant Examiner.*